United States Patent [19]

Foulston

[11] Patent Number: 5,884,308
[45] Date of Patent: Mar. 16, 1999

[54] UPDATING DISTRIBUTED DATA FILES USING ACTIVE TOKEN DISTRIBUTED AT DIFFERENT TIMES TO DIFFERENT SITES

[75] Inventor: John H. Foulston, Woodbridge, United Kingdom

[73] Assignee: British Telecommunications public limited company, London, England

[21] Appl. No.: 727,519

[22] PCT Filed: Apr. 12, 1995

[86] PCT No.: PCT/GB95/00852

§ 371 Date: Nov. 12, 1996

§ 102(e) Date: Nov. 12, 1996

[87] PCT Pub. No.: WO95/29450

PCT Pub. Date: Nov. 2, 1995

[30] Foreign Application Priority Data

Apr. 21, 1994 [EP] European Pat. Off. .............. 94302864

[51] Int. Cl.⁶ .................................................. G06F 17/30
[52] U.S. Cl. .................................................. 707/8; 707/9
[58] Field of Search ........................................ 707/1, 8, 9

[56] References Cited

U.S. PATENT DOCUMENTS

| | | | |
|---|---|---|---|
| 5,333,316 | 7/1994 | Champagne et al. | 707/8 |
| 5,377,351 | 12/1994 | Kotera et al. | 707/8 |
| 5,388,256 | 2/1995 | Herbert | 707/8 |
| 5,408,653 | 4/1995 | Josten et al. | 707/10 |
| 5,418,945 | 5/1995 | Carter et al. | 707/8 |
| 5,418,966 | 5/1995 | Madduri | 707/8 |
| 5,442,758 | 8/1995 | Slingwine et al. | 707/1 |
| 5,469,575 | 11/1995 | Madduri | 707/8 |
| 5,485,607 | 1/1996 | Lomet et al. | 707/8 |
| 5,495,609 | 2/1996 | Scott | 707/8 |
| 5,526,517 | 6/1996 | Jones et al. | 707/8 |
| 5,544,353 | 8/1996 | Forman et al. | 707/8 |
| 5,546,580 | 8/1996 | Seliger et al. | 707/8 |
| 5,551,023 | 8/1996 | Alonso | 707/8 |
| 5,551,046 | 8/1996 | Mohan et al. | 707/8 |
| 5,557,792 | 9/1996 | Josten et al. | 707/8 |

FOREIGN PATENT DOCUMENTS 0 398 496  11/1990  European Pat. Off. ............... 15/40

OTHER PUBLICATIONS

Summers, Local Area Distributed Systems, IBM Systems Journal, vol. 28, No. 2, pp. 227–240, 1989.

Summers, "Local–Area Distributed Systems", IBM Systems Journal, vol. 28, No. 2, 1989, Armonk, New York US, pp. 227–240.

Primary Examiner—Thomas G. Black
Assistant Examiner—Frantz Coby
Attorney, Agent, or Firm—Nixon & Vanderhye P.C.

[57] ABSTRACT

Each file in a computer system has associated with it a token. No user is permitted to update any file unless that user is the current token holder. Thus, in multi-sited computer installations where nominally identical files are held in several data stores, only one copy of the file is ever updated at any one time. Tokens can only be transferred from one user to another with the permission of the current token holder, and on transfer of a token the latest version of the file accompanies that token. Some nodes of a computer system may have read access to obsolete versions of a file but each node holding an obsolete file is notified of current file versions available.

26 Claims, 3 Drawing Sheets

UPDATING DISTRIBUTED DATA FILES USING ACTIVE TOKEN DISTRIBUTED AT DIFFERENT TIMES TO DIFFERENT SITES

BACKGROUND OF THE INVENTION

The present invention relates to data storage and more particularly to the storage of data files which may be subjected to updating at more than one location.

RELATED ART

In any organisation which has data processing capability at different sites, conflict can arise if common data is differently modified at one site compared to another.

A data file at site "A" may be transferred to site "B" and subsequent amendments at each site result in two completely different end files. This may result in different decisions being taken at the two sites based on what is believed to be the same data.

One way to avoid such conflict is for one site, say site "A" to be in absolute control of the data file, to be responsible for all amendments and data input to that file.

This complicates procedure. For example, if new data is to be added from site "B", the data must first be keyed at site "B", transferred to site "A" and checked and entered at site "A" before further processing can take place.

Alternatively, site "B" may have direct input capability to data stores at site "A" but this could result in users at both sites updating a data file at the same time resulting in an unrecognisable file output for either party. Further, such an arrangement requires the use of wide area network technology and high speed data links, which may add significant cost penalties. Incompatability of the processing systems at the two sites can also be a problem.

Making data file copies from a master library at "run-time" is one way to ensure that the latest available data file is available. However, if more than one copy is in use, being updated and potentially returned to the master library only amendments at one site may be recorded.

Such conflicts may have serious effects on multi-sited businesses, particularly if data entry on one site (perhaps sales entry) leads into activity on another site (such as purchasing or scheduling).

In published European patent application number 398496 a fileserver system is disclosed in which shared data files are accessible by a number of client machines. At any one time on-line access to a specific shared data file is controlled by the fileserver such that if a first client machine has write access no other machine has read or write access to that file. Further, the system disclosed in EP398496 prevents write access to data file if any client machine currently has read access. Thus, if any client wishes to update a data file, the fileserver must revoke all current read accesses (and receive an acknowledgement of revocation of the read token from each current client "reader") prior to permitting issue of a read/write token.

Such a system while efficacious for on-line access to a single fileserver site is not suitable for use where files may be required in a number of different locations or where data transfer may take a considerable time. Further, where data transfer between nodes is by way of virtual mail messages delay in acknowledgement of a read revocation may inhibit data update at the read/write requesting node.

SUMMARY OF THE INVENTION

According to the present invention there is provided a computer system having a plurality of nodes (A–G) at different locations, each node comprising one or more processor units (1) data storage (2) of the computer system containing common data files for which users at different locations have update access, each such common data file having a single respective data token which permits update access to the data file only at the node currently holding the respective data token, characterised in that the data storage comprises a respective data store (2) at each node (A–G), each data store (2) storing a respective copy of at least some common data files and for each common data file for which the system holds a plurality of copies one of the data stores is designated a master library, the master library retaining a record of the node currently holding the respective data token.

Preferably, data tokens are passed between nodes of the system and on each transfer of a token between a node the master library node is notified of token transfer and the latest version of the data file is stored in the master library.

The master library may be arranged to cause transfer of the latest version of a data file to all other nodes which require access to that file on receipt of the token at the master library node.

BRIEF DESCRIPTION OF THE DRAWINGS

A computer system in accordance with the present invention will now be described by way of example only, with reference to the accompanying drawings of which:

FIGS. 3B to 3D show data transfers occurring in the distributed data network of FIG. 3a.

DETAILED DESCRIPTION OF EXEMPLARY EMBODIMENTS

Figure 1:
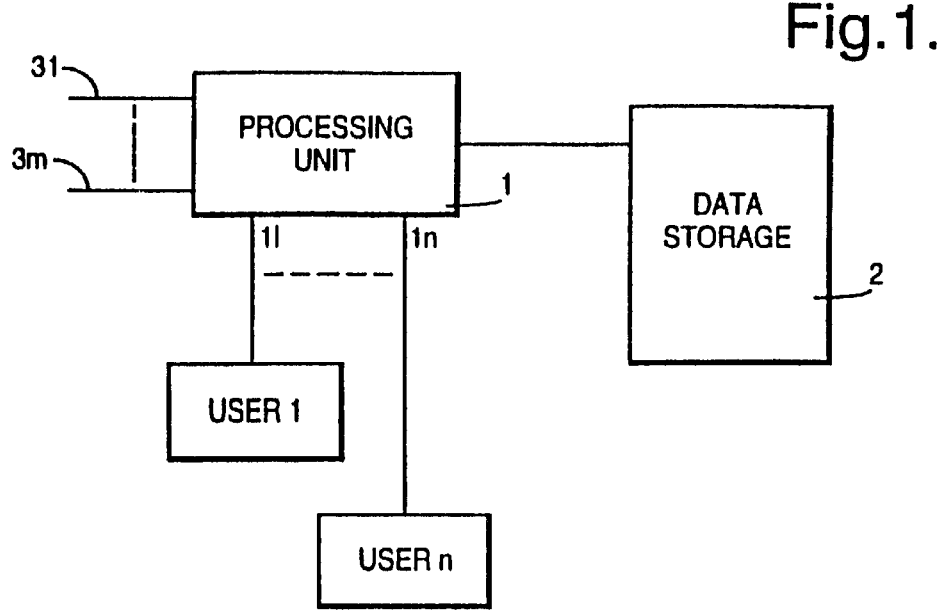
FIG. 1 shows a schematic diagram of one embodiment of a typical single node arrangement.

Referring first to FIG. 1, there is shown one node of a computer system including a processing unit 1 serving a number of users 11 to 1n. Each of the users 11 through in will access the processing unit 1 by way of a personal computer, for example, in known manner.

The processing unit 1 will act as a fileserver in a known manner to transfer data files from a central data store 2 to a requesting user 11 to in dependent upon access rights having been granted to the particular user.

As this is one node of the computer system, network connections 31 to 3m are provided to other nodes in the system either through direct modem links or by dial up links using suitably protected data transfer methods. Thus each node in the system has access to all data held in the data stores 2 in all of the other nodes in the system, although access limitations may be applied.

Figure 3A:
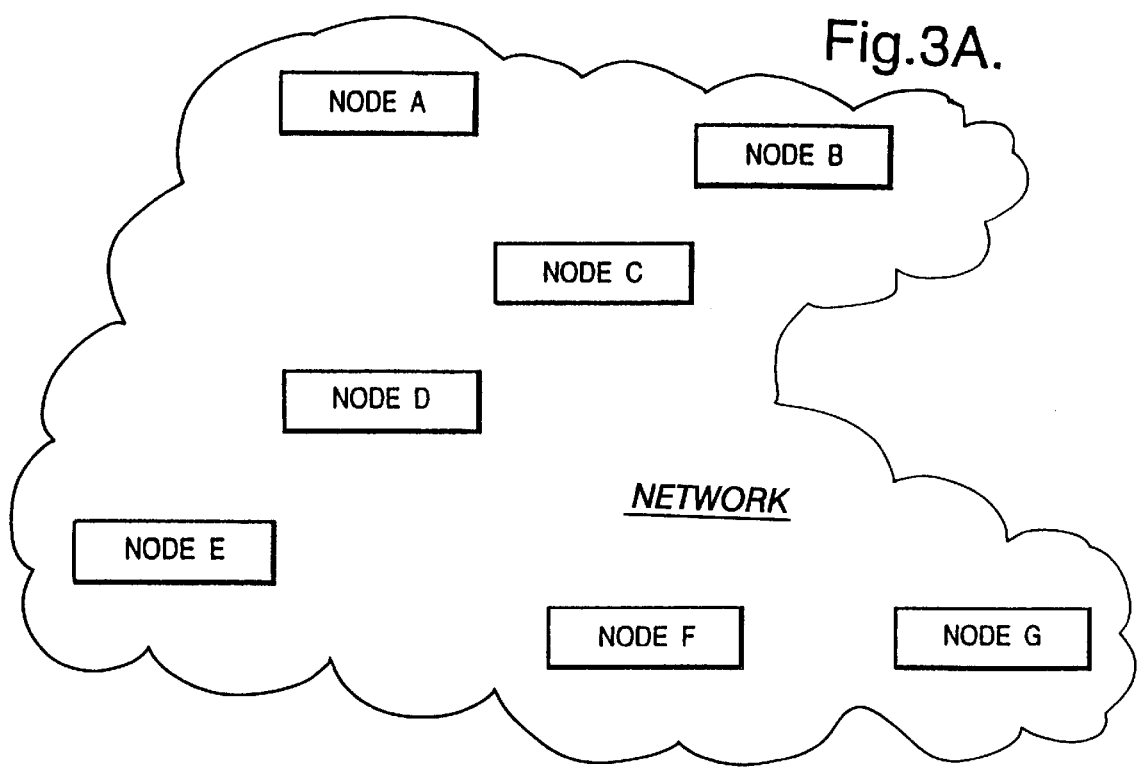
FIG. 3A shows a distributed computer system according to an embodiment of the invention.

Turning now to FIG. 3a, a network having seven nodes A to G is shown. The nodes may be geographically separated with nodes on different continents if required. Each node in the system will have some programs common to all of the nodes and in particular will have an appropriate electronic mail or similar communications program to enable messages to be sent to other nodes and received therefrom.

Referring again to FIGS. 1 and 3, considering a data file being created by user 11 at node D, the user effects data entry, say, of a customer list with details of the customer's current service and equipment levels. This causes an identifiable file to be created which will be stored in the data store 2 at node D. The file is identified by name in a known manner resulting in the creation of a file header and for the purposes of this description the file is referred to herein as file "A".

Figure 2:
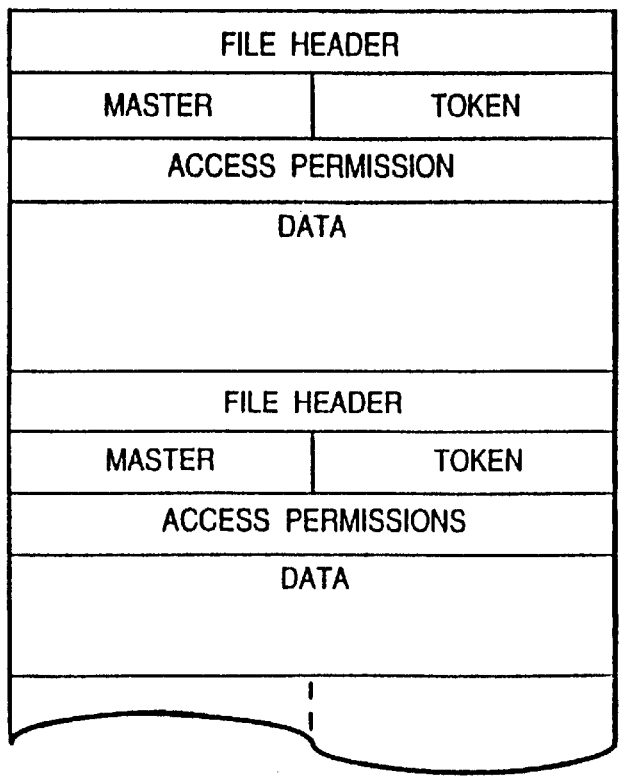
FIG. 2 shows schematically file arrangements in the data store of FIG. 1.

Referring also to FIG. 2, the file header, apart from identifying file A, includes "master" and "token" indicators and an access permissions listing. On creation of a file (sometimes referred to as a controlled item) to which more than one node has users with write access, both master and token indicators are set positive. The creating node (in this case node D), that is where a new controlled item is first originated, is automatically designated the master library for the created item.

Figure 3B:
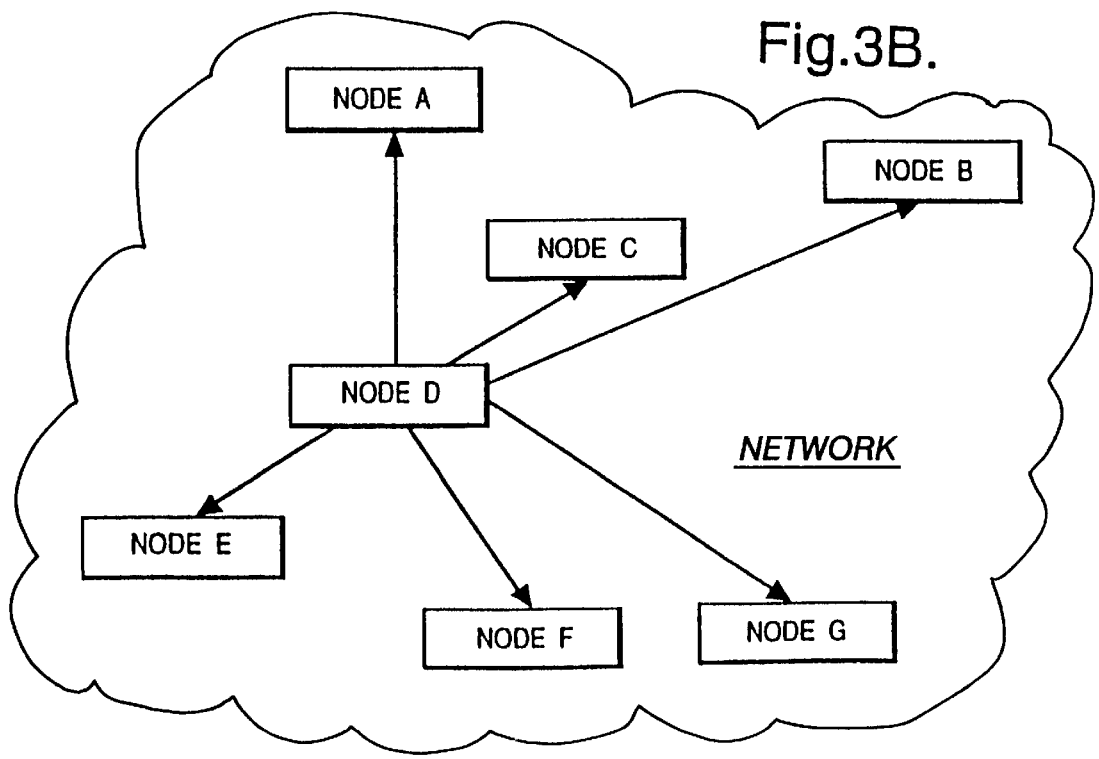

User 11 having created the item may enter specific access permissions to other users. Thus a named user at node G may be given read and write access to file A and a general read access only given to all other users in the network. The newly created file A is labelled with a time and date stamp, and messages are created by the processing unit 1 at node D and forwarded to all other nodes. In the case of nodes A, B, C, E and F the message is a copy of file A with read only access permission in the header. In the case of node G, the message is a copy of file A with the specified user for write access and read only access for all others in the header. This message transfer is schematically represented in FIG. 3b. Although for smaller systems, it is possible to forward mail messages including the created file, where larger systems are in use, or to save communications time, the created file may be ommitted. Thus, in one method of working, foiwing the creation of file A at node D mail messages are sent to the other nodes announcing its creation and availability. The actual file is only transferred on request from one of the other nodes for that file or if the user at node D (who is the default token holder) instructs the transfer of the token to another authorised user.

Now if the authorised user at node G wishes to update file A the processing unit 1 at node G checks the copy of file A held in its data store to ensure that appropriate access permission has been given. If so, the next step is to read the associated token. If the token is not positive in respect of the particular user, then a mail message is sent to the node (node D) which is the master library for file A. This message requests the update token for the specific user.

Figure 3C:
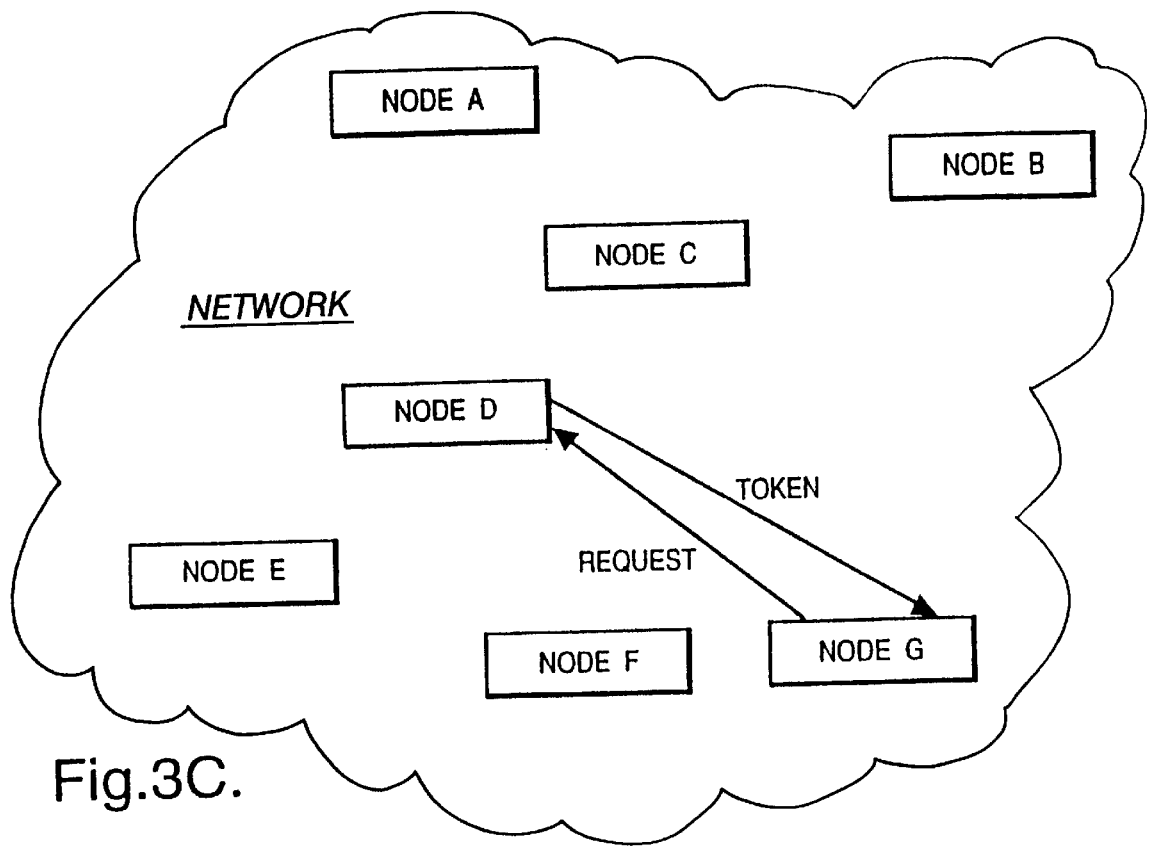

Assuming that file A is not in use at node D and the token is positive in the node D data store 2, subject to the current token holder (user) giving permission the node D processing unit 1 sets its associated token to negative, notes the token destination and forwards a mail message to node G. This mail message comprises the latest version of the file together with the data token. Node G sets the appropriate token positive and the authorised user may now update file A in known manner. This transfer is schematically shown in FIG. 3c. Node D may send mail messages to each of the other nodes A, B, C, E and F to warn that any copy of file A currently held in their respective data stores 2 may not be the latest version. This message may also identify the current token holder.

Consider now a new file (file B) created at node A, to which users at nodes C, D, F and G have update access. Node A is the master library and the creating user at node A is the default token holder. Initial file transfer occurs in the manner previously described for file A or on request of the system administrator for the other nodes.

Figure 3D:
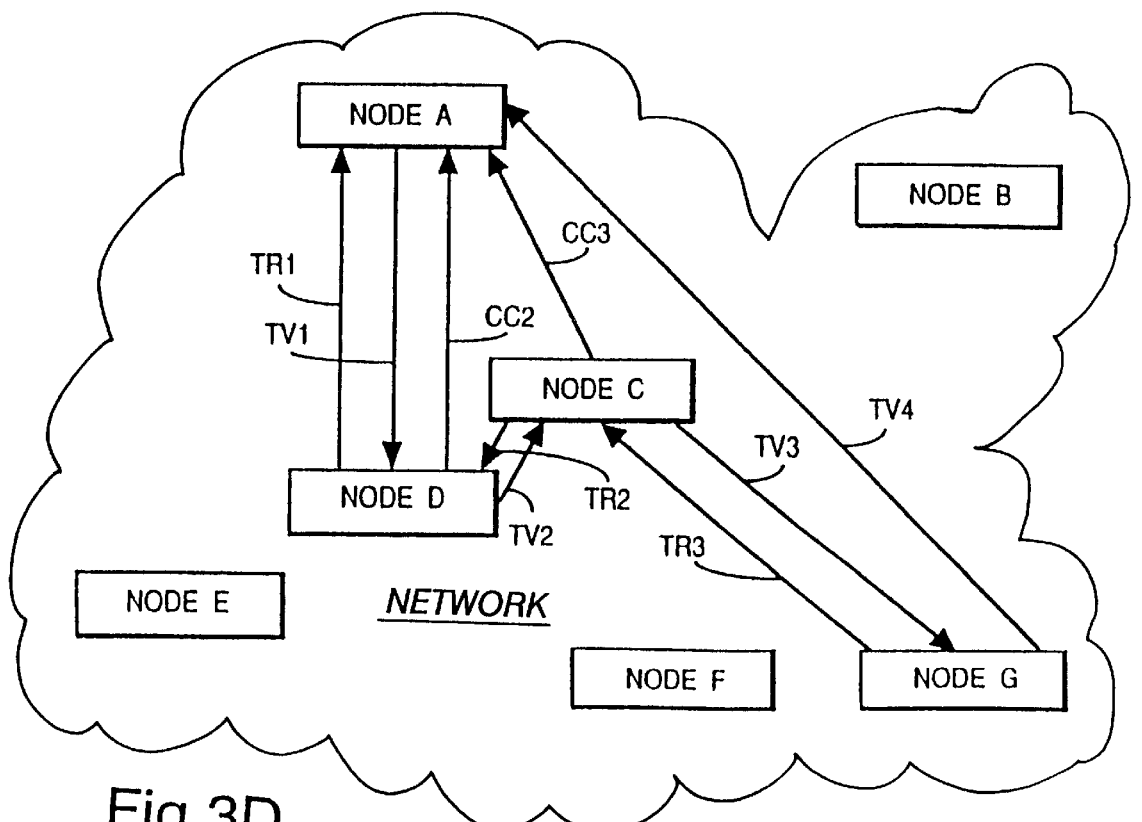

Supposing updates of file B require several users to participate, then the following interchanges may occur;

Referring to FIG. 3d node D forwards a token request (TR1) to node A. This request results in file B and its token being transferred (TV1) in node D in the same manner as described above. Now, if node C requires access then a request (TR2) is sent to node D. Node D forwards the token and its latest version of file B as a mail message (TV2) to node C. Simultaneously, a mail message (CC2) is sent to node A with the latest version of file B attached but without the token.

Node C may pass the token to node G in similar manner (TR3, TV3) with a mail message (CC3) again being sent to node A. Thus, the master library for file B always contains the latest version of that file but users at node A are not entitled to update it. Also it should be noted that the current token holder is known to the master library.

While file B may be available for read-only access at any of the nodes, only node A and the current token holding node, node G, hold the latest version.

On completion of activity at node G, the node G user may decide to return the token to the default token holder at node A. This requires a mail message (TV4) comprising the updated file B (with its time and date stamp) and the token.

When a node, which is acting as master library for a particular file, receives a message including the token it compares records of versions (time and date stamp) held by each of the other nodes in the system. If any node (even those with read-only access) has an obsolete version then the master library node causes a message to be sent to that other node either attaching a copy of the latest file or indicating that the later version of the file is available. In this latter case then a file transfer will only occur if a request is received from the appropriate node or if the token is again transferred from node A.

Thus, for file B, as the latest version is already at nodes G and A, messages are sent to nodes C, D and F. Nodes B and E are assumed not to have users of file B and do not therefore receive an update.

It should be noted that if a user on node A requires access to file B for update purposes whilst the token is held by another user then token requesting to the appropriate node, say node G, will occur in the same manner as previously described and, subsequent to the current user (token holder) granting permission for file transfer the token and latest version are returned from node G to node A. Although imminent updating of file B is likely to occur because node A has received a latest version together with a token being passed to it from another node the procedure outlined above for updating other nodes in the system will be followed.

When more than one authorised user is on the same node, token transfer occurring between users on the same node does not result in messaging to the master library. Messaging to the master library only occurs when the token is passed between nodes which results in an update message being sent to the master library.

It should be noted that whenever updating of a file is occurring it is on the latest version of the file since only one update copy ever exists. Whenever the token is transferred between nodes, a copy of the file accompanies the token. Of course; whenever the token is transferred within a node, the latest version of the file is already held in the respective data store.

What is claimed is:

1. A computer system comprising:
   a plurality of nodes at different locations, each node comprising one or more processor units and data storage containing common data files for which users at different locations have update access, each such common data file having a single respective data token which permits update access to the data file only at the node currently holding the respective data token, the data storage including a respective data store at each node, each data store storing a respective copy of at least some common data files to which read access is maintained at all times and for each common data file for which the system holds a plurality of copies one of the data stores is designated a master library, the master library retaining a record of the node currently holding the respective data token.

2. A computer system as in claim 1 wherein, on each transfer of a data token between users, the latest version of the file associated with the respective data token is transferred.

3. A computer system as in claim 2 wherein, on transfer of a token between nodes neither of which includes the master library for the respective token, a copy of the latest version of the respective associated file is also transferred to the node which includes the master library.

4. A computer system as in claim 1 wherein each time a node receives a token from another node in respect of a file for which the receiving node includes the master library, the processor unit forwards an updating indication to all other nodes holding obsolete versions of the received file.

5. A computer system as in claim 1 wherein each time a token is transferred between users on differing nodes the node including the master library for the respective file associated with the transferred token forwards a transfer indication to all other nodes holding copies of that file.

6. A computer system as in claim 1 wherein each file in the system has a designated master library and an associated update token and only the current token holder can authorize the transfer of the token to any other user.

7. A method for updating stored data files in a computer system having a plurality of nodes at different locations, each node comprising one or more processor units and data storage containing common data files for which users at different locations have update access, each such common data file having a single respective data token which permits update access to the data file only at the node currently holding the respective data token, said method comprising:

including a respective data store at each node, storing at each data store a respective copy of at least some common data files to which read access is maintained at all times, and designating each common data file for which the system holds a plurality of copies one of the data stores as a master library, the master library retaining a record of the node currently holding the respective data token.

8. A method as in claim 7 wherein, on each transfer of a data token between users, the latest version of the file associated with the respective data token is transferred.

9. A method as in claim 8 wherein, on transfer of a token between nodes neither of which includes the master library for the respective token, a copy of the latest version of the respective associated file is also transferred to the node which includes the master library.

10. A method as in claim 7 wherein each time a node receives a token from another node in respect of a file for which the receiving node includes the master library, the processor unit forwards an updating indication to all other nodes holding obsolete versions of the received file.

11. A method as in claim 7 wherein each time a token is transferred between users on differing nodes the node including the master library for the respective file associated with the transferred token forwards a transfer indication to all other nodes holding copies of that file.

12. A method as in claim 7 wherein each file in the system has a designated master library and an associated update token and only the current token holder can authorize the transfer of the token to any other user.

13. A distributed computer system comprising a plurality of nodes at different locations, each node comprising:

at least one processor unit;

a data store which stores a plurality of data files; and at least one end user terminal;

said data stores at least two of said nodes including replicated data files, each such replicated file having one of said nodes designated as a respective master library, and having a respective single update token which controls updating of the file such that updating is permitted only at the node holding the token, reading of replicated files being permitted at any node;

said data token being transferred on request between nodes so that sequential updating of files may be carried out at different ones of said nodes, each transfer of the token being accompanied by the replicated file version as held at the transferring node, the replicated file version being simultaneously copied to the master library node, said master library node updating respective file versions at other nodes only when said master library holds said respective associated update token.

14. A distributed computer system as in claim 13 in which on each transfer of an update token between nodes, the node holding the master library notifies the location of the token to all other nodes which hold respective copies of the replicated file.

15. A distributed computer system as in claim 14 in which any node requiring update access to a replicated file forwards an update token request to the node currently holding the token.

16. A distributed computer system as in claim 13 in which said master library node updates file versions at other nodes each time the update token returns to the node.

17. A distributed computer system as in claim 13 in which the master library node transfers an updated file to another of said nodes only if the master library node receives a request for the updated file version.

18. A distributed computer system as in claim 13 in which the master library node notifies all other nodes of the availability of a later version of a replicated file each time the respective update token associated with the file is received at the master library node.

19. A distributed computer system as in claim 13 in which some of the nodes include at least two end user terminals and at least two respective users at the same node have update permission to a respective replicated file, the update token being passed between users at the node without messaging to the master library node.

20. A method for updating a distributed computer system comprising a plurality of nodes at different locations, each node including at least one processor unit; a data store which stores a plurality of data files; and at least one end user terminal; said data stores at least two of said nodes including replicated data files each such replicated file having one of said nodes designated as a respective master library, said method comprising:

using a respective single update token which controls updating of the file such that updating is permitted only at the node holding the token, reading of replicated files being permitted at any node;

transferring said data token on request between nodes so that sequential updating of files may be carried out at different ones of said nodes, each transfer of the token being accompanied by the replicated file version as held at the transferring node, the replicated file version being simultaneously copied to the master library node, said master library node updating respective file versions at other nodes only when said master library holds said respective associated update token.

21. A method as in claim 20 in which on each transfer of an update token between nodes, the node holding the master library notifies the location of the token to all other nodes which hold respective copies of the replicated file.

22. A method as in claim 21 in which any node requiring update access to a replicated file forwards an update token request to the node currently holding the token.

23. A method as in claim 20 in which said master library node updates file versions at other nodes each time the update token returns to the node.

24. A method as in claim 20 in which the master library node transfers an updated file to another of said nodes only if the master library node receives a request for the updated file version.

25. A method as in claim 20 in which the master library node notifies all other nodes of the availability of a later version of a replicated file each time the respective update token associated with the file is received at the master library node.

26. A method as in claim 20 in which some of the nodes include at least two end user terminals and at least two respective users at the same node have update permission to a respective replicated file, the update token being passed between users at the node without messaging to the master library node.

* * * * *